(No Model.)
G. W. PERO.
CAR COUPLING.
No. 387,916. Patented Aug. 14, 1888.
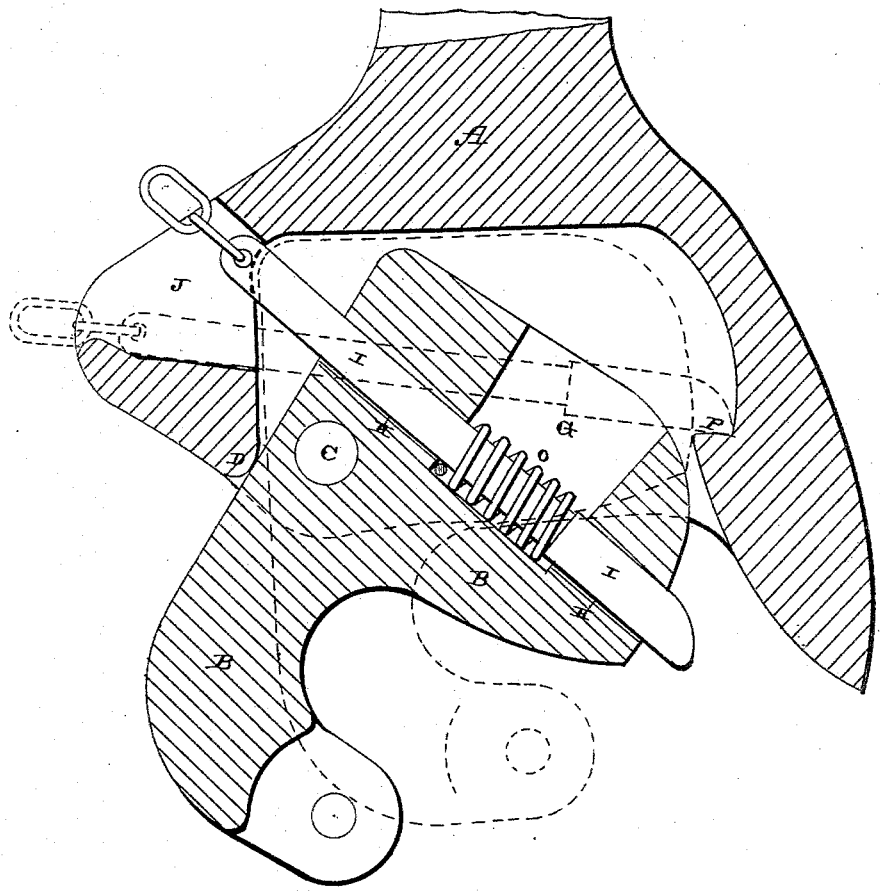
Witnesses.
L. F. Gardner.
Allen S. Pattison.
Inventor.
Geo. W. Pero,
per F. A. Lehmann,
Atty

UNITED STATES PATENT OFFICE.

GEORGE W. PERO, OF WEST NEW BRIGHTON, NEW YORK, ASSIGNOR OF ONE-HALF TO E. D. CLARK, OF SAME PLACE.

CAR-COUPLING.

SPECIFICATION forming part of Letters Patent No. 387,916, dated August 14, 1888.

Application filed May 26, 1888. Serial No. 275,146. (No model.)

*To all whom it may concern:*

Be it known that I, GEORGE W. PERO, of West New Brighton, in the county of Richmond and State of New York, have invented certain new and useful Improvements in Automatic Car-Couplings; and I do hereby declare the following to be a full, clear, and exact description of the invention, such as will enable others skilled in the art to which it pertains to make and use it, reference being had to the accompanying drawing, which forms part of this specification.

My invention relates to an improvement in automatic car-couplings; and the object of my invention is to place a spring-actuated link-pin in the hook itself, so that the latch always moves with the hook, and which latch, after the hook is closed, locks it in position.

The accompanying drawing represents a horizontal section of a coupler embodying my invention, the parts being shown in one position in solid lines and in another position in dotted lines.

A represents the draw-head, which may be of any desired shape or construction that may be desired, and in which the hook B is pivoted by means of the bolt C. This bolt is placed about the center of the hook, so that the hook will turn freely thereon in opening and closing, and thus prevent any unnecessary strain from being brought to bear upon this bolt. When the hook is opened, as shown in solid lines, its outer side strikes against the projecting point D upon the draw-head, and thus prevents it from opening any farther. When the hook is closed, it strikes against the head at the back of the recess. While the hook is closed and the latch is in an operative position, this pivotal pin or bolt C can be removed, and the hook will still remain in position, being held by the spring-actuated latching-bolt.

Through the inner portion of the hook is formed a suitable opening, and through the rear edge of the hook is formed a recess, G, which intersects the opening H, in which the latching-bolt I is placed. This bolt I is passed through the opening J, made through one side of the draw-head A, and through the opening H in the hook and through the coil-spring O, which is placed in the recess G. One end of this latching-bolt I being larger than the other, one end of the spring bears against the shoulder upon the bolt, while the other bears against the side of the recess, as shown. When the bolt I is drawn backward, by means of a chain or other device connected thereto, the spring O returns the bolt to position as soon as it is left free to move. When the hook is opened, the end of the bolt projects beyond the end of the hook, as shown; and when the hook is closed by the running together of the cars the point of the bolt is forced backward through the hook until its point reaches the offset or shoulder P, when it instantly snaps out and locks the hook in this position. While the hook is in this position, the latching-bolt extends across from the shoulder P, and the front side of the opening J, and the whole strain upon the hook is then transferred to this bolt. As above stated, while the hook is thus held the pivotal bolt or pin C can be removed and the hook will still remain in position. Should the spiral spring be disengaged or broken, the coupler can be made perfectly secure by fastening the bolt in place by a wire, string, or any other material. As the strain upon the spring is very slight, there is little danger, however, that it will ever become broken or injured. If it should become injured, it can be at once removed by removing the hook from the draw-head.

This coupler can be made much lighter than others of the same type, as there are fewer parts. Another advantage is the perfect protection of the working parts from snow and ice. The only part which can possibly become coated with ice is the end of the bolt or latch, and the driving back of the latch by the closing action of the hook will entirely remove any substance which may accumulate upon the bolt.

This hook is adapted to make connection with the old form of link and pin in the usual manner.

Having thus described my invention, I claim—

1. In a car-coupling, the combination of a pivoted hook with an automatic latching-bolt which passes through the hook and moves therewith, substantially as shown and described.

2. The combination of the draw-head, the pivoted hook placed therein, and the spring-actuated bolt which passes through the hook and engages with the shoulders upon opposite sides of the draw-head, whereby the strain upon the hook is transferred to the bolt, substantially as set forth.

In testimony whereof I affix my signature in presence of two witnesses.

GEORGE W. PERO.

Witnesses:
EDWARD D. CLARK,
FRED E. BROWN.